Nov. 18, 1952  A. L. LEE  2,618,491
FOUR-WHEEL STEERING ASSEMBLY
Filed Aug. 30, 1947  2 SHEETS—SHEET 1
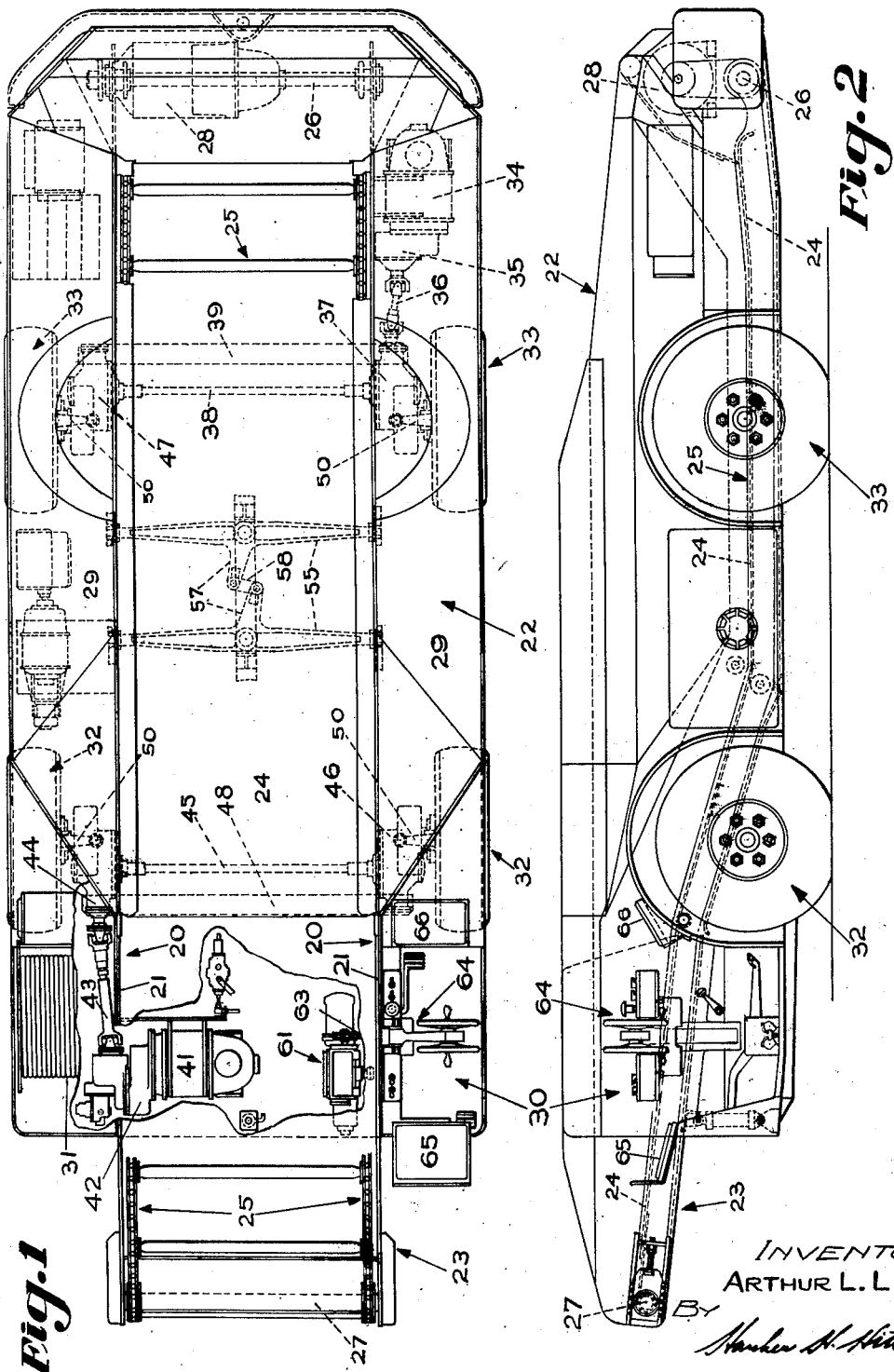
INVENTOR,
ARTHUR L. LEE,
BY
ATTY.

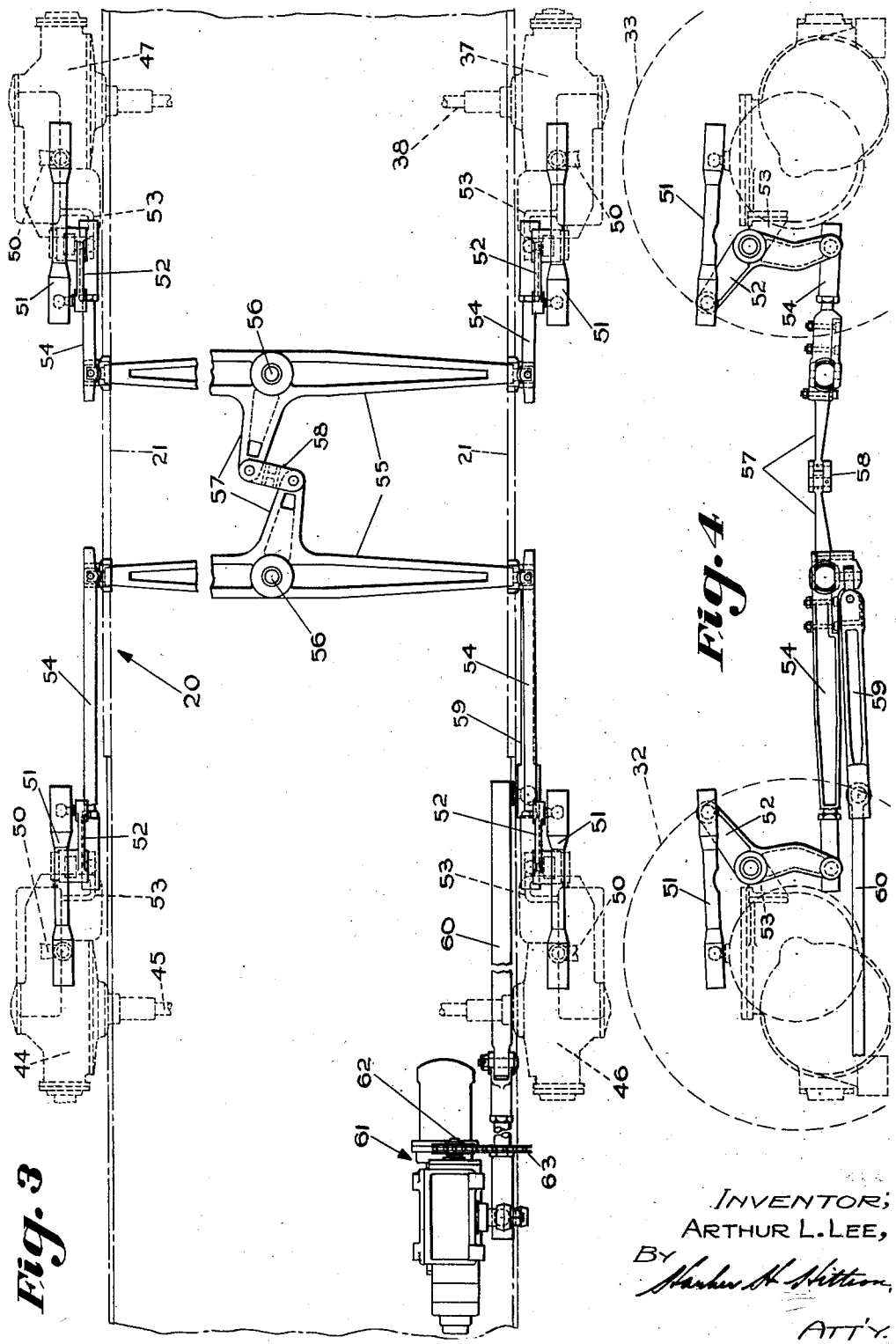

Patented Nov. 18, 1952

2,618,491

UNITED STATES PATENT OFFICE 2,618,491

FOUR-WHEEL STEERING ASSEMBLY

Arthur L. Lee, Upper Arlington, Ohio, assignor to The Jeffrey Manufacturing Company, a corporation of Ohio Application August 30, 1947, Serial No. 771,542

2 Claims. (Cl. 280—91)

This invention relates to a shuttle car which is a vehicle designed particularly for carrying loose material, such as coal, between a loading machine adapted to operate in a coal mine room or the like, and an entry conveyor or mine cars.

An object of the invention is to provide a shuttle car having improved steering mechanism by which all four of the wheels of the shuttle car may be steered.

Other objects of the invention will appear hereinafter, the novel features and combinations being set forth in the appended claims.

In the accompanying drawings,

Fig. 1 is a plan view of a shuttle car incorporating the features of my invention, with parts being broken away;

Fig. 2 is a side elevational view of the vehicle of Fig. 1;

Fig. 3 is a plan view of the steering linkage which interconnects the four steerable power driven wheels, the main frame and the wheel gearing being shown in dash and dot lines and in dotted lines, rsepectively; and Fig. 4 is a side view of the steering linkage, with other parts of the vehicle shown in dotted lines.

Referring particularly to Figs. 1 and 2 of the drawings, the shuttle car, incorporating the features of my invention, includes a main frame 20 having laterally spaced, longitudinally extending side members 21 which are interconnected by a plurality of cross members, most of which are not shown in the drawings.

Mounted on said main frames 20 is an elongated, longitudinally extending body 22, adjacent the rear or discharge end of which there is a chute 23 adapted to overhang a mine car or entry conveyor into which coal from the body 22 is discharged. The bottom of the coal carrying body 22 is formed by a bottom plate 24 of substantially uniform width extending over a path which varies in elevation, as clearly illustrated by reference to Fig. 2 of the drawings.

An endless chain and flight conveyer 25 has its upper or working run traveling over the bottom plate 24, with its return run traveling beneath said bottom plate 24. The conveyer 25 extends between head shaft 26 and foot, tail or discharge shaft 27, the former of which is driven through an appropriate chain and sprocket drive mechanism from an electric motor 28.

As clearly seen by reference to Figs. 1 and 2 of the drawings, the body 22 includes a pair of laterally spaced side walls 29, which are in part vertical and in part laterally sloping, to provide a maximum capacity for any given height. The side walls 29 converge adjacent the discharge end of the body and extend upright throughout the length of the discharge chute 23, thereby providing an operator's station 30 adjacent one side of the vehicle and within the extreme lateral confines thereof and adjacent said chute 23. At a similar position on the opposite side of the chute 23 an electric cable reel 31 is located, by which electric current may be derived for the several electric motors provided on the shuttle car.

The shuttle car is provided with four wheels, preferably provided with pneumatic tires, there being a pair of wheels 32 adjacent the rear or discharge end and a pair of wheels 33 adjacent the front end. One of the features of the shuttle car, which is of considerable practical importance and which is broadly disclosed and claimed in my Patent No. 2,457,569, dated December 28, 1949, is the provision of driving means for the wheels 32 and 33 so that the wheels 32 adjacent one end of the vehicle are driven by one electric motor through a differential which is located adjacent one of the wheels and outside the main frame and body of the vehicle, there being a similar drive gearing for the pair of wheels 32 adjacent the other end of the vehicle also driven through a differential, located outside the main frame and body, by a separate electric motor. This means that there are only two driving motors and that the pair of wheels at either end are differentially geared and driven from a common motor. This also means there is a complete absence of longitudinally running drive gearing which has been found objectionable because of the unnatural differential action as well as because of the space consumed by the longitudinal gearing which has tended to reduce materially the available capacity of the body and, obviously, the factor of high capacity for the body is an important consideration in a shuttle car.

Referring particularly to Fig. 1 of the drawings, it will be seen that an elecric motor 34 drives a shaft 36 through a universal joint, which shaft 36 is connected through a second universal joint to a differential 37 mounted in a casing, the casing in turn being mounted outside the main frame 20 of the shuttle car.

The differentially connected shafts of the differential 37 drive a laterally extending shaft 38 which extends to reduction gearing in a housing similar to the housing of differential 37 within which the differential mechanism has been eliminated, the reduction gearing extending to one of the wheels 33 of the pair adjacent the front end of the car. The other differential shaft, which is a short stub shaft, drives reduction gearing leading through a double universal joint, or the like, which is mounted on a substantially horizontal axis and drives the adjacent wheel 33.

The details of the differential 37 and laterally extending shafts, one of which extends to drive gearing connecting it to the adjacent wheel 33, are disclosed in my Patent No. 2,381,672, dated August 7, 1945, and consequently this structure is not again here illustrated in detail.

Adjacent the rear end of the shuttle car there is another electric motor 41 (see Fig. 1) which drives an overload release clutch 42 through drive gearing, not shown. Extending from the clutch 42 and driven thereby is a drive shaft 43 (see Fig. 1) which has a driving connection with a differential 44 through universal joints at opposite ends of said shaft 43. Differential 44 is preferably identical with differential 37, both being in accordance with my Patent No. 2,381 672, and the two drive shafts which extend laterally therefrom drive the rear pair of wheels 32 at opposite sides of the shuttle car.

This drive gearing includes a transverse cross shaft 45 which leads to a reduction gearing housing 46 which has the same construction as the housing of differential 37, but the differential is omitted and a straight stub shaft substituted, as suggested, for example, in my Patent No. 2,457,569, previously mentioned.

The assembly of the wheel 32 and drive gearing 46 follows that disclosed in detail in my Patent No. 2,381,672 above mentioned, except for the elimination of the differential.

It may be mentioned that the structure of the differentials 37 and 44 is preferably identical, as is the associated wheel assembly, and the structure of the reduction gearings 46 and 47 is identical. Furthermore, the structure of all of the four wheel assemblies 32 and 33 and associated reduction gearings is the same, except that there are differentials in the two units 37 and 44 which are replaced by straight drive shafts in the units 46 and 47, comparable with the disclosure in my Patent No. 2,457,569, though the drive from the differentials to the wheels or from the straight shafts to the wheels, as the case may be, follows that of my Patent No. 2,381,672, rather than that of my Patent No. 2,457,569.

In the preferred embodiment of my invention, all four of the wheels 32 and 33 are power driven, as above described. However, in certain broader aspects only one pair of said wheels may be power driven. In the illustrated form the two pairs of wheels 32, 33 are interconnected to be simultaneously steered, the gearing being of compensating character so as to provide turning of the vehicle in a minimum radius, with the wheels compensated to turn about a substantially common point.

The steering mechanism which interconnects the four wheels 32 and 33 is disclosed particularly in Figs. 3 and 4 of the drawings, to which attention is now directed. Each wheel 32, 33 is mounted for steering or dirigible adjustment on a sloping upright axis and is provided with adjusting arm 50. Connected to the inner end of each arm 50 by a ball and socket joint is a short drag link 51 which extends substantially parallel with the main frame 20. Thus each drag link 51 extends toward, rather than away from, the other wheel on the same side of the main frame, or toward the transverse center of the main frame 20 or body 22. The inner end of each drag link 51 is connected by a ball and socket joint to a rocker arm 52 which is pivotally attached to a bracket 53 carried by the associated housings 45, 46, 47 or 37, the rocker arm 52 being pivotally mounted on a horizontal transversely extending axis.

At the lower end of each rocker arm 52 there is another drag link 54 which is also parallel with the longitudinal axis of the main frame 20 and is located in a horizontal plane substantially along that of said main frame 20. All the drag links 52 and 54 are outside the main frame 20 and closely adjacent thereto and parallel therewith. Drag links 54 all extend toward the transverse center of the vehicle or, in other words, each drag link 54 extends toward the wheel at the opposite end of the vehicle.

At their inner ends drag links 54 are trunnioned on substantially upright axes to one end of a reversing lever 55, there being two of these reversing levers 55, as clearly illustrated in Fig. 3 of the drawings. Each reversing lever 55 has a pair of drag links 54 trunnioned thereto, one adjacent each end thereof, the drag links associated with each reversing lever 55 being specific to the pair of wheels at one end of the vehicle. Reversing levers 55 are pivotally connected to the main frame 20 by pivot means 56 which mount them for pivotal movement on upright axes along the longitudinal center of the main frame 20.

Each of the reversing levers 55 has a crank arm 57, the two crank arms extending generally towards each other, being laterally spaced apart a small amount, as illustrated in Fig. 3 of the drawings, and having their outer ends connected by a link 58 which ties them together, requiring their swinging movement in unison and in reverse directions. In other words, if the right hand reversing lever 55 swings clockwise, as viewed in Fig. 3, the left-hand reversing lever 55 will necessarily swing counterclockwise. Thus it is evident that the four steerable wheels 32 and 33 are tied together for steering operation and by applying steering movement to the interconnecting mechanism all four of the wheels will be simultaneously steered in a proper manner.

Actuation of the interconnecting steering mechanism above described to effect steering of the vehicle is through an operating drag link 59 and a pivoted operating rod 60 which is controlled by a standard mechanically operated power boosted steering gear 61 of any well known standard make, an illustration of which is the commercially known Bendix-Ross steering gear. This steering gear 61 is rigidly attached to the main frame by mechanism not disclosed in detail and is controlled by driving control shaft 62 thereof through an endless chain 63 which is part of a steering wheel assembly 64.

By reference to Figs. 1 and 2 of the drawings, it will be seen that the steering wheel assembly 64 is located at the operator's station 30 and it is mounted on one of the side walls 29 forming one side of the discharge chute 23. This steering wheel assembly is dual in character, since the operator must be able to reverse his position in order to operate the shuttle car with equal facility, whether traveling forwardly or reversely. To this end there are dual controls at the operator's station 30, including separate seats 65 and 66 located on opposite sides of the steering wheel assembly 64.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. A vehicle including a frame, four steerable wheels therefor including two on each side of said frame in pairs at opposite ends of said frame, steering mechanism for said wheels including a longitudinally extending drag link near each wheel and connected to a steering arm thereof, the inner end of each drag link extending toward the other wheel on the same side of said frame, a rocker arm pivotally connected at its top to the inner end of each drag link and pivotally mounted on a horizontal axis, a second longitudinally extending drag link near each wheel and connected at the bottom to said rocker arm and extending toward the other wheel on the same side of said frame, the inner end of each second drag link being near the longitudinal center of said frame, a pair of reverse levers each pivoted at its center on an upright axis along the longitudinal center of said frame, means connecting the inner end of each said second drag link to an end of a reverse lever, linkage means interconnecting said reverse levers moving them in reverse directions, and means for adjusting said steering wheels together.

2. A vehicle including a frame, four steerable wheels therefor including two on each side of said frame in pairs at opposite ends of said frame, steering mechanism for said wheels including a longitudinally extending drag link near each wheel and connected to a steering arm thereof, the inner end of each drag link extending toward the other wheel on the same side of said frame, a rocker arm pivotally connected to the inner end of each drag link and pivotally mounted on a horizontal axis, a second longitudinally extending drag link near each wheel and connected to said rocker arm and extending toward the other wheel on the same side of said frame, the inner end of each second drag link being near the longitudinal center of said frame, a pair of reverse levers each pivoted at its center on an upright axis along the longitudinal center of said frame, means connecting the inner end of each said second drag link to an end of a reverse lever, linkage means interconnecting said reverse levers moving them in reverse directions, and means for adjusting said steering wheels together.

ARTHUR L. LEE.

REFERENCES CITED

The following references are of record in the file of this patent:

UNITED STATES PATENTS

| Number | Name | Date |
|---|---|---|
| 1,805,536 | White | May 19, 1931 |
| 2,274,295 | Horton | Feb. 24, 1942 |
| 2,318,756 | Chouings | May 11, 1943 |
| 2,325,731 | Arentzen et al. | Aug. 3, 1943 |
| 2,336,386 | Beck | Dec. 7, 1943 |
| 2,358,236 | Lee | Sept. 12, 1944 |
| 2,372,013 | Rockwell | Mar. 20, 1945 |
| 2,461,116 | Jeffery | Feb. 8, 1949 |

FOREIGN PATENTS

| Number | Country | Date |
|---|---|---|
| 393,975 | France | Jan. 11, 1909 |
| 750,687 | France | Aug. 16, 1933 |